United States Patent Office 3,299,319
Patented Jan. 17, 1967

3,299,319
DIMMER FOR ELECTRIC LAMPS
Osamu Nomura, Kohoku-ku, Yokohama-shi, Japan, assignor to Tokyo Shibaura Electric Co., Ltd., Kawasaki-shi, Japan, a corporation of Japan
Filed Mar. 3, 1964, Ser. No. 348,981
Claims priority, application Japan, Mar. 4, 1963,
38/11,315
1 Claim. (Cl. 315—199)

This invention relates to a dimmer to vary the current flowing through an electric lamp load whereby to control the intensity of illumination thereof.

Heretofore numerous types of dimmers or dimmer circuits have been proposed for this purpose, but they were not always satisfactory because they were required to use at least two controlled rectifier elements, such as silicon controlled rectifier elements in order to control the load current over 0 to 100%, in other words, during the whole period of the respective half cycles of the alternating current source. Accordingly the prior dimmers were relatively expensive, and it is the general object of this invention to provide simple, cheap, yet effective dimmer circuit which can control smoothly the load current over a very wide range with simple construction.

While the specification concludes with claims particularly pointing out and distinctly claiming the subject matter which is regarded as the invention, it is believed that the invention will be better understood from the following description taken in connection with the accompanying drawings, in which FIG. 1a and FIG. 2a illustrate circuit diagrams of the prior dimmer devices for electric lamp loads;

A prior dimmer of one type comprises silicon controlled rectifier elements, as shown in FIG. 1 and the current flowing through an electric lamp load is controlled by controlling the conduction phase angle of the rectifier elements.

Figure 1A:
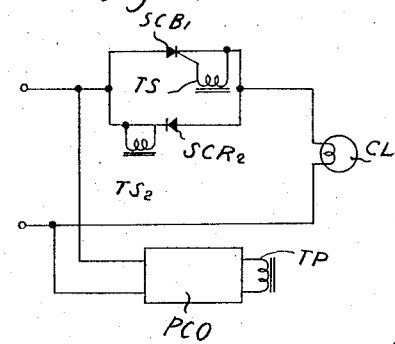
FIG. 1b and FIG. 2b show voltage and current wave forms to explain the operating characteristics of the circuits shown in FIG. 1a and FIG. 2a, respectively.

More in detail, as shown in FIG. 1a, a pair of controlled rectifier elements $SCR_1$ and $SCR_2$, connected in parallel but with opposite polarities, are inserted between the controlled electric lamp load CL and the source of electric supply. Further a source of signals of variable phase PCO is provided to impress its output signals across the gate and cathode electrodes of said controlled rectifier elements $SCR_1$ and $SCR_2$ through a transformer including a primary winding $T_p$ and two secondary windings $TS_1$ and $TS_2$. As is well known in the art, the intensity of illumination of the lamp load CL is controlled by varying the current conduction angle during the successive half cycles of the alternating current.

Figure 1B:
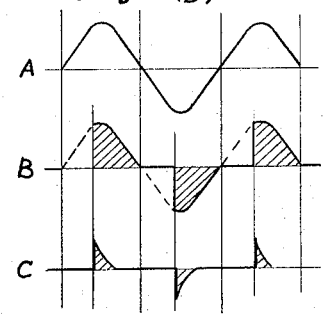

As can be noted from the curve A showing the voltage of the source, the curve B showing the load current and the curve C showing the gate current, FIG. 1b control of the current conduction angle results in the variation in the integrated value of the load current (shaded portion of the load current) whereby to vary the intensity of illumination of the lamp. Thus it is evident that by varying the conduction phase angle of the respective controlled rectifier elements any desired control of the illumination can be provided.

Figure 2A:
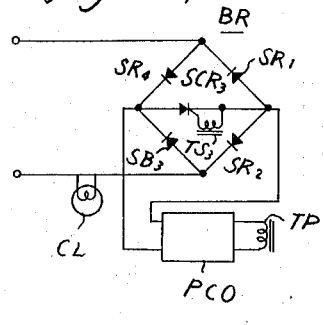
Figure 2B:
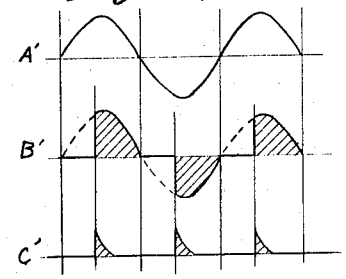

In FIG. 2a there is shown a further example of a prior dimmer circuit comprising a bridge rectifier circuit BR including bridge connected rectifier elements $SR_1$, $SR_2$, $SR_3$ and $SR_4$. Across the output terminals of the rectifier bridge circuit is connected a silicon controlled rectifier element $SCR_3$ which is controlled by a signal of variable phase supplied from a source PCO. Thus it is able to control the controlled lamp load CL just in the same manner as above described. The various wave forms are shown in FIG. 2b, wherein curve A′ represents the source voltage, curve B′ the load current and the curve C′ the gate current.

However these prior dimmer circuits are expensive in that they require to use either two expensive silicon controlled rectifier elements or one silicon controlled rectifier element together with four rectifier elements.

It is the object of this invention to eliminate the disadvantage described above.

It is a further object of this invention to provide a cheap and simple dimmer for electric lamp load.

In accordance with this invention these objects are attained by providing a novel dimmer circuit comprising a controlled rectifier element and a rectifier element which are connected in parallel but with opposite polarities.

Figure 3:
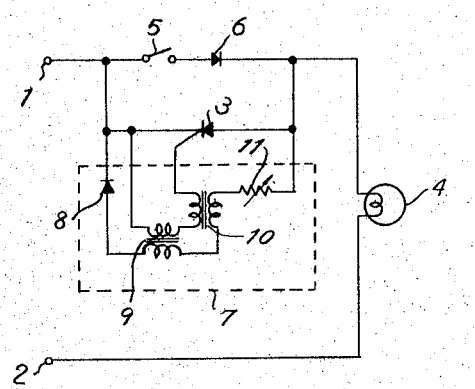
FIG. 3 is a circuit diagram of one embodiment of this invention.

Referring now to FIG. 3 illustrating one embodiment of this invention, there is shown a series circuit including a silicon controlled rectifier element 3 having a polarity as shown and a controlled electric lamp load 4 and connected across the supply terminals 1 and 2. Across said controlled rectifier element is the other series circuit including a switch 5 adapted to change the degree of illumination control and a conventional rectifier element or a diode 6, said rectifier element 6 having opposite polarity with regard to the silicon controlled rectifier element 3.

A variable phase signal generator 7 provided for controlling the conduction of said controlled rectifier element 3 comprises a series combination which is connected across the anode and cathode electrodes of the silicon controlled rectifier element 3 and including a rectifier element 8 adapted to block reverse current, the primary winding of a transformer 9, the primary winding of a saturable reactor 10 and a variable resistor 11, and a second series circuit connected across the gate and cathode electrodes and including the secondary windings of said transformer and saturable reactor.

Figure 4A:
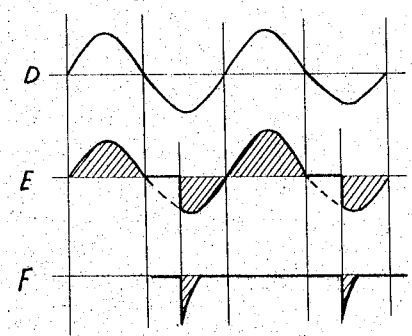
FIG. 4a and FIG. 4b are graphs of the voltage and current wave forms to explain the operation characteristics of the embodiment shown in FIG. 3.

With the dimmer constructed as above described, when the switch 5 is closed current flows through the rectifier element and the controlled electric lamp load during the whole half cycle of one polarity whereas during the other half cycle of the opposite polarity current flows through the silicon controlled rectifier element 3. Thus by varying the conduction phase angle by means of the variable phase signal generator the load current can be varied dependent upon the integrated value of these currents. In FIG. 4a, curve D represents the voltage of the source, curve E the load current and curve F the gate current of the silicon controlled rectifier element. As shown by these curves, during alternate half cycles of polarity the load current flows throughout the respective half cycles but during half cycles of the opposite polarity current flows during 50 to 100% of the respective half cycles dependent upon the current conduction angle controlled by the gate current.

It will be understood that the variable phase signal generator can regulate as desired the phase at which the controlled rectifier element is rendered conductive by the fact that the reset point of the core of the variable reactor can be varied by adjusting the variable resistor 11 when the anode voltage of the silicon controlled rectifier element 3 is positive thus reducing the impedance to vary the phase when the core is saturated whereby to produce in the secondary winding of the transformer 9 a gate current having steep wave front.

Figure 4B:
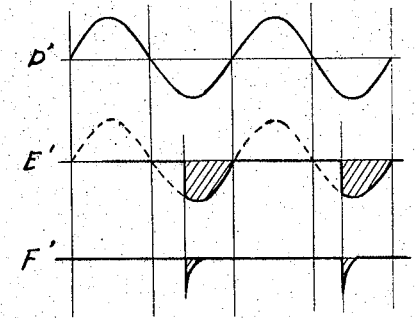

When the switch 5 is opened to cut-off the rectifier element 6 the load current flows only during the alternate half cycles through the silicon controlled rectifier element so that by determining the conduction phase angle by the variable phase signal generator 7 in the same manner as above described the load current can be controlled over a range of from 0 to 50%, as shown in FIG. 4b, depending upon the respective phases whereby enabling to control the intensity of illumination of the controlled lamp load, curves D', E' and F' in FIG. 4b having the same meaning as the curves D, E and F of FIG. 4a.

Thus this invetion provides a unique dimmer by means of which the load current can be continuously varied over the entire range of 0 to 100% by cutting-in and cutting-out of one rectifier element effected by closing and opening of a switch together with the phase control of a silicon controlled rectifier element effected by a variable phase signal generator.

While a saturable reactor has been utilized in the above described variable phase signal generator it will be obvious to those skilled in the art that a variable phase signal generator utilizing a unijunction transistor or any other suitable variable phase signal generator can be substituted for the generator illustrated and described.

Also while in the above described embodiment only one silicon controlled rectifier element and only one conventional rectifier elements were shown, a plurality of such rectifier elements may be used in series or in parallel dependent upon the voltage and or current capacities.

As can be clearly noted from the preceding description this invention provides a simple yet efficient dimmer for electric lamp load, comprising a silicon controlled rectifier element adapted to conduct current during half cycles of one polarity and a conventional rectifier element adapted to conduct current during the other half cycles of the opposite polarity and by cutting-in and cutting-out said latter rectifier element.

While the invention has been explained by describing a particular embodiment thereof, it will be apparent that improvements and modifications may be made without departing from the scope of the invention as defined in the appended claim.

What is claimed is:

A dimmer for an electric lamp load disposed across A.-C. terminals, comprising in combination, a first circuit in series with said lamp having a switch and a rectifier element; a second circuit in series with said lamp and in parallel with said first circuit having a silicon controlled rectifier, the polarity thereof, defining the forward firing being opposite to that of said first circuit rectifier element, said silicon controlled rectifier including a firing control element; a third circuit including one lead extending to said first circuit, a second lead extending to said silicon controlled rectifier firing control element, having a saturable reactor secondary in series between said leads; and, a fourth circuit in parallel with said first and second circuits including a second rectifier element disposed to block reverse current flow, the primary of said saturable reactor defining the firing angle of said silicon controlled rectifier over an A.-C. cycle, and variable resistance means for adjusting said firing angle.

References Cited by the Examiner
UNITED STATES PATENTS 2,722,649  11/1955  Immel _____ 307—88.5
3,120,633  2/1964  Genuit _____ 307—88.5

JOHN W. HUCKERT, *Primary Examiner.*

J. D. KALLAM, D. O. KRAFT, *Assistant Examiners.*